United States Patent [19]
Isozaki

[11] Patent Number: 6,161,690
[45] Date of Patent: *Dec. 19, 2000

[54] DISK CARTRIDGE CASE

[75] Inventor: Makoto Isozaki, Tokyo, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/864,989

[22] Filed: May 29, 1997

[30] Foreign Application Priority Data

May 31, 1996 [JP] Japan ................................ 8-138448

[51] Int. Cl.[7] ................................................ B65D 85/57
[52] U.S. Cl. ................................ 206/308.1; 206/308.3
[58] Field of Search ........................... 206/308.1, 308.3, 206/449; 369/291; 220/4.22, 4.23, 608, 836–839

[56] References Cited

U.S. PATENT DOCUMENTS

| | | | |
|---|---|---|---|
| 2,631,631 | 3/1953 | Vogel | 220/838 |
| 4,127,189 | 11/1978 | Shumrack et al. | 220/4.23 |
| 4,511,034 | 4/1985 | Pan | 206/308.3 |
| 4,519,500 | 5/1985 | Perchak | 206/308.3 |
| 4,589,551 | 5/1986 | Hellon | 220/837 |
| 4,762,228 | 8/1988 | McConnell, III et al. | 220/836 |
| 4,815,600 | 3/1989 | Niles et al. | 206/308.3 |
| 4,869,364 | 9/1989 | Bray | 206/308.3 |
| 4,883,195 | 11/1989 | Ott et al. | 220/839 |
| 4,892,189 | 1/1990 | Kunimune et al. | 206/308.1 |
| 5,097,252 | 3/1992 | Katagiri | 206/387.1 |
| 5,261,534 | 11/1993 | Krebs | 206/308.1 |
| 5,363,956 | 11/1994 | Taniyama | 206/312 |
| 5,388,713 | 2/1995 | Taniyama | 206/308.1 |
| 5,443,159 | 8/1995 | Cheng | 206/387.1 |
| 5,495,940 | 3/1996 | Taniyama | 206/308.1 |
| 5,499,714 | 3/1996 | Konno | 206/387.1 |
| 5,513,749 | 5/1996 | Simmons | 206/308.1 |

FOREIGN PATENT DOCUMENTS

| | | |
|---|---|---|
| 0 531 113 A2 | 3/1993 | European Pat. Off. . |
| 0 566 403 A2 | 10/1993 | European Pat. Off. . |
| 2 272 889 | 6/1994 | United Kingdom . |
| WO 94/-5566 | 3/1994 | WIPO . |

*Primary Examiner*—Jim Foster
*Attorney, Agent, or Firm*—Sughrue, Mion, Zinn, Macpeak & Seas, PLLC

[57] ABSTRACT

A disk cartridge case for containing therein a flat disk cartridge includes a case body and a lid member which are hinged together at their one side edges to be opened and closed. A protrusion is provided on the inner surface of at least one of the case body and the lid member to restrain the disk cartridge contained in disk cartridge case from moving in the direction of thickness of the disk cartridge case.

11 Claims, 5 Drawing Sheets

DISK CARTRIDGE CASE

BACKGROUND OF THE INVENTION

1. Field of the Invention

This invention relates a disk cartridge case for containing therein a magnetic disk cartridge, a magnetooptical disk cartridge, optical disk cartridge or the like and, more particularly to a disk cartridge case for containing therein a single disk cartridge.

2. Description of the Related Art

There have been known various types of disk cartridge cases. For example, there have been known a boxlike case which contains a stack of disk cartridges and a file-like case which contains a plurality of disk cartridges erected side by side. Such a disk cartridge case is sometimes sold with the disk cartridges contained therein and sometimes sold by itself.

The disk cartridge case is used for the purpose of damping impact from the outside and preventing entrance of dust during storage and transportation. Accordingly, the disk cartridge case may be of such a thickness and a size that a single disk cartridge and a label card generally supplied with the disk cartridge can be contained therein. For example, in the case of a 3.5" magnetic disk cartridge about 3.3 mm thick, the disk cartridge case may be about 5 mm in thickness.

On the other hand, reduction of thickness of the disk cartridge case is limited for the following reason. That is, the disk cartridge case is generally sold wrapped with packaging film which is bonded at a side face of the case. Accordingly, it is necessary that the width of the side face, i.e., the thickness of the case, is at least 7 to 8 mm in order to ensure an area for bonding the packaging film.

Due to the thickness difference between the disk cartridge case and the disk cartridge, the disk cartridge is loosely held in the case and can be moved back and forth, which results in poor protection against vibration and a rattling noise during transportation.

SUMMARY OF THE INVENTION

In view of the foregoing observations and description, the primary object of the present invention is to provide a disk cartridge case which can hold tight the disk cartridge, thereby damping impact on the disk cartridge and preventing generation of a rattling noise.

The disk cartridge case for containing therein a flat disk cartridge in accordance with the present invention comprises a case body and a lid member which are hinged together at their one side edges to be opened and closed, and is characterized in that a protrusion is provided on the inner surface of at least one of the case body and the lid member to restrain the disk cartridge from moving in the direction of thickness of the disk cartridge case.

When the protrusions are provided on the respective inner surfaces of both the case body and the lid member, it is preferred that the protrusions be opposed to each other in the direction of thickness of the case so that the disk cartridge contained in the case is not deformed when caught between the protrusions. Further a plurality of such protrusions may be provided on the inner surface of the case body and/or the lid member.

Said label card which is generally supplied with the disk cartridge comprises releasing paper and adhesive-backed labels applied to the releasing paper and is contained in the disk cartridge case together with the disk cartridge. Said protrusion should have such a height that the effective inner thickness of the disk cartridge case is in the range of a value slightly smaller than the outer thickness of the disk cartridge to be contained in the disk cartridge case to a value larger than the same by about 0.2 mm. The effective inner thickness means the distance between the top surface of the protrusion and the surface opposed to the protrusion with the lid member closed. For example, when a protrusion is provided only on the inner surface of one of the case body and the lid member, the effective inner thickness means the distance between the top surface of the protrusion and the inner surface of the other of the case body and the lid member. When a pair of protrusions are provided on the respective inner surfaces of the case body and the lid member opposed to each other, then the effective inner thickness means the distance between the top surfaces of the protrusions. It is preferred that the effective inner thickness of the disk cartridge case be slightly smaller than the total thickness of the disk cartridge and the label card. With this arrangement, the disk cartridge can be held tight not to rattle under the resiliency of the disk cartridge case, and at the same time, the disk cartridge can be held tight not to rattle even when the label is applied to a recessed label site on the disk cartridge and the disk cartridge is contained in the disk cartridge case. As is well known, since the label site on the disk cartridge is recessed, the total thickness of the disk cartridge and the label is smaller after application of the label to the disk cartridge than before the same. Further a spare label card is sometimes contained in the disk cartridge case together with a disk cartridge applied with a label. Thus the total thickness of the members to be contained in the disk cartridge case varies depending on the manner of use. In the case of a disk cartridge with a shutter member like a 3.5" magnetic disk cartridge, it is preferred that the protrusion be positioned not to opposed to the shutter member.

Thus in accordance with the present invention, the disk cartridge can be held tight in the disk cartridge case, whereby impact on the disk cartridge can be well damped and generation of a rattling noise during transportation can be prevented.

When a plurality of protrusions are provided on the inner surface of the case body and/or the lid member, the disk cartridge is more stably held in the disk cartridge case.

DESCRIPTION OF THE PREFERRED EMBODIMENTS

Figure 1:
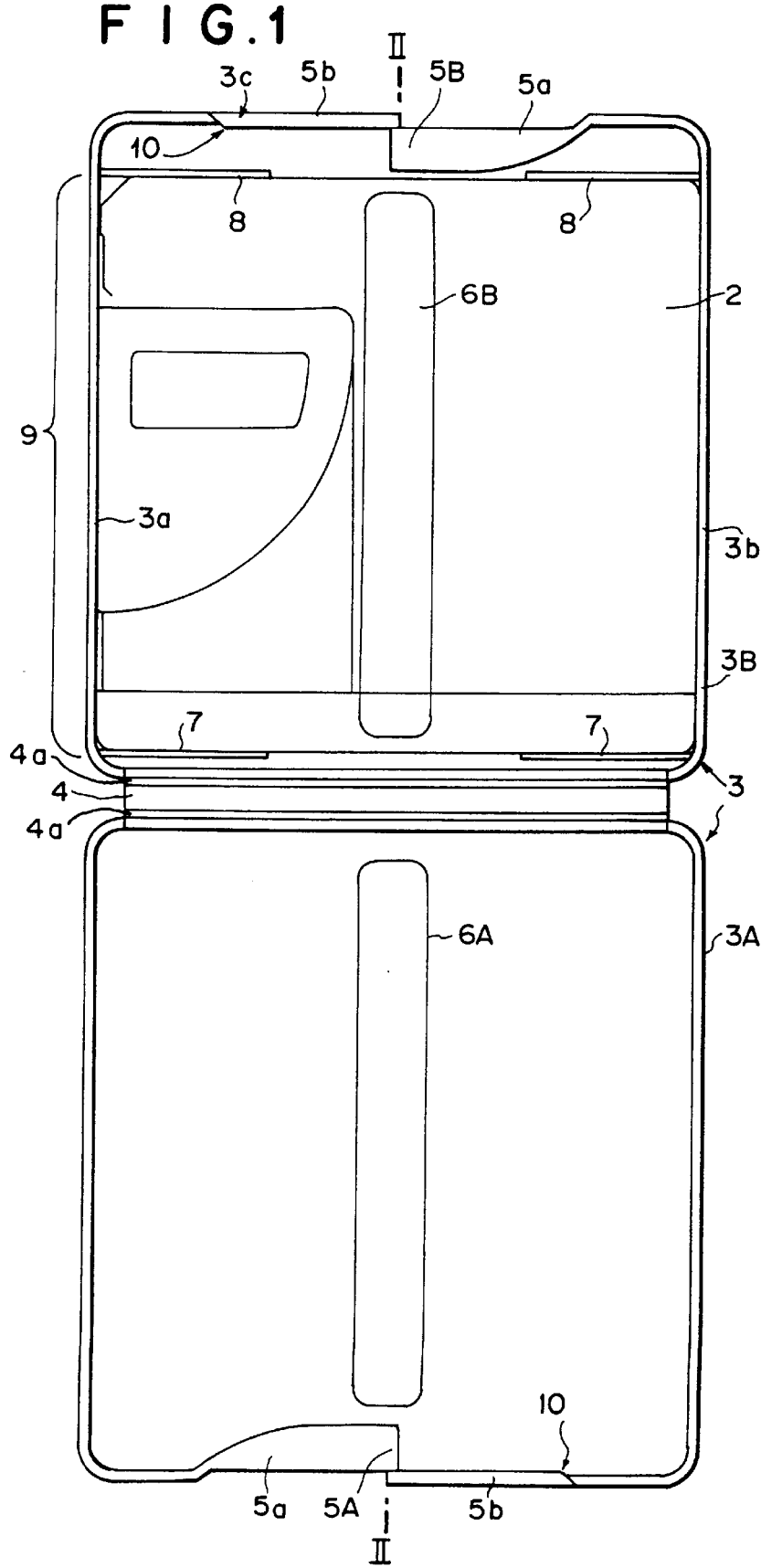
FIG. 1 is a plan view showing a disk cartridge case in accordance with a first embodiment of the present invention with the lid ember opened and a disk cartridge contained in the case body.
Figure 2:
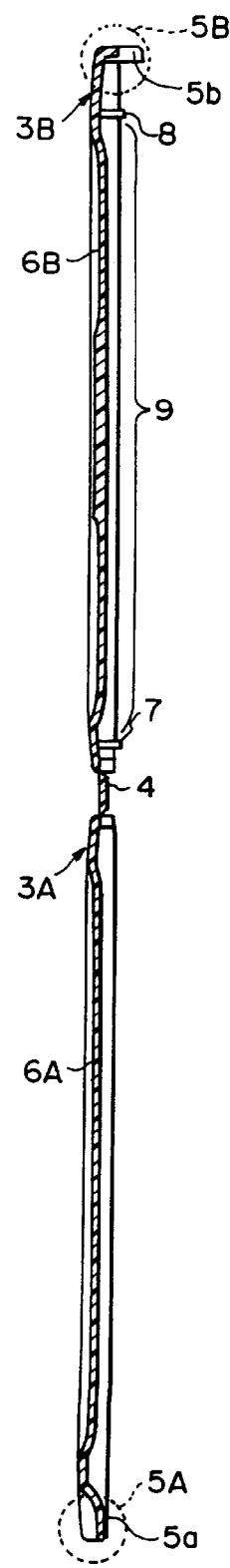
FIG. 2 is a cross-sectional view taken along line II—II in FIG. 1.
Figure 3:
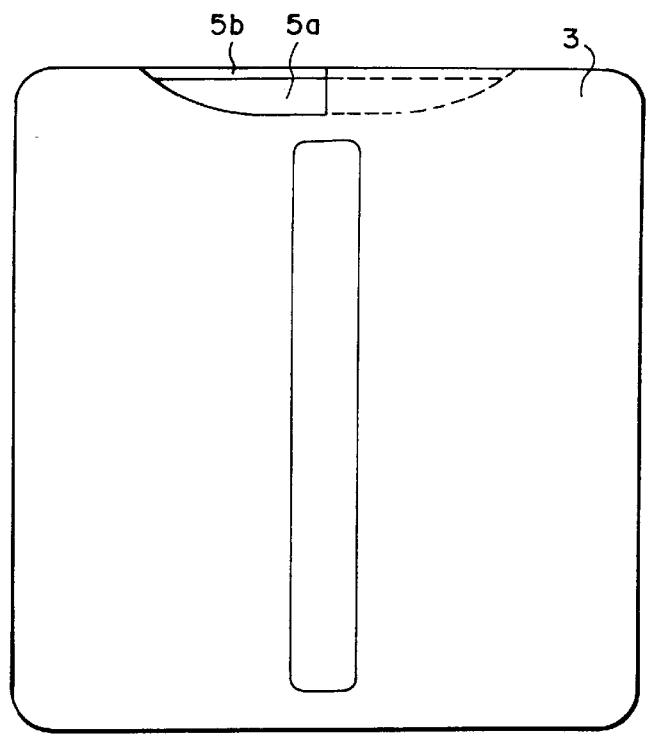
FIG. 3 is a plan view showing the disk cartridge case of the first embodiment with the lid member closed.

As shown in FIGS. 1 and 2, a disk cartridge case 3 for containing a magnetic disk cartridge 2 in accordance with a first aspect of the present invention comprises a case body 3B and a lid member 3A.

One side edge of the lid member 3A is hinged to one side edge of a connecting plate 4 by way of a flexible self-hinge 4a and one side edge of the case body 3B is hinged to the other side edge of the connecting plate 4 by way of another self-hinge 4a. Latch portions 5A and 5B are formed on the respective other side edges of the lid member 3A and the case body 3B. The lid member 3A and the case body 3B are rotatable about the respective hinges 4a only inward, and are held in the closed position through the engagement of the latch portions 5A and 5B with each other. The disk cartridge case 3 is formed integrally by injection molding of plastic material such as polypropylene, polyethylene or the like.

The case body 3B is substantially square and has rounded four corners. The case body 3B has therein a space 9 for containing the magnetic disk cartridge 2. The space 9 is defined by a pair of opposed outer walls 3a and 3b, and a pair of opposed inner walls 7 and 8, one formed near the connecting plate 4 and the other formed near the latch portion 5B. When the magnetic disk cartridge 2 is contained in the space 9, the peripheral edges of the magnetic disk cartridge 2 are in contact with walls 3a, 3b, 7 and 8. An elongated protrusion 6B extends across the space 9 at the middle thereof between the connecting plate 4 and the latch portion 5B.

The lid member 3A is shallower than the case body 3B and substantially the same as the case body 3B in shape.

Figure 5:
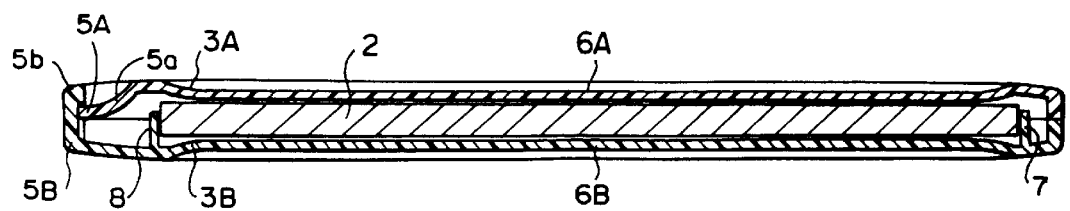
FIG. 5 is a cross-sectional view showing the disk cartridge case of the first embodiment with the lid member closed and a magnetic disk cartridge contained therein.

An elongated protrusion 6A extends across the lid member 3A in a position where the protrusions 6A and 6B are opposed to each other when the disk cartridge case 3 is closed. The protrusions 6A and 6B abut against opposite major side surfaces of the magnetic disk cartridge 2 as shown in FIG. 5.

Figure 4:
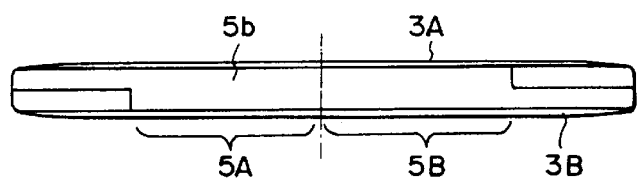
FIG. 4 is a side view showing the disk cartridge case of the first embodiment with the lid member closed.

Each of the latch portions 5A and 5B comprises an arcuate recess 5a formed inward from the edge of the lid member 3A or the case body 3B and a projection 5b which is of the same length as the recess 5a along the edge and projects inward of the case 3. The recess 5a of each of the latch portions 5A and 5B is brought into engagement with the projection 5b of the other latch portion when the case 3 is closed as shown in FIG. 4, thereby holding the case closed. When the case 3 is opened, the latch portions 5A and 5B are disengaged from each other by pushing the projections 5b.

The disk cartridge case 3 of this embodiment is formed of a flexible material which is equivalent to or slightly lower than the material of a conventional disk cartridge case in rigidity so that the latch portions 5A and 5B can be kept engaged even if a label card or other sheet is contained in the case 3 and an excessive pressure is not applied to the disk cartridge to adversely affect the disk cartridge. For example, polypropylene is suitable.

When the magnetic disk cartridge 2 is placed in the space 9 in the body case 3B and the case 3 is closed to bring the latch portions 5A and 5B into engagement with each other, the protrusions 6A and 6B on the lid member 3A and the case body 3B hold the magnetic disk cartridge 2 therebetween, whereby the magnetic disk cartridge 2 is held stationary in the disk cartridge case 3.

The number and the shape of the protrusions need not be limited to those of the first embodiment.

Figure 6C:
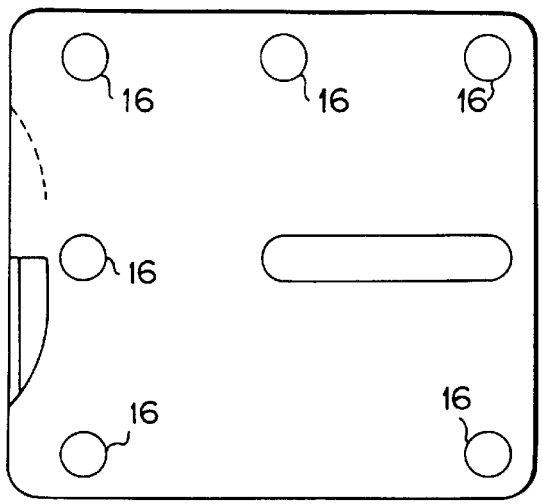
FIG. 6C is a plan view showing the disk cartridge case of the second embodiment with the lid member closed.
Figure 6A:
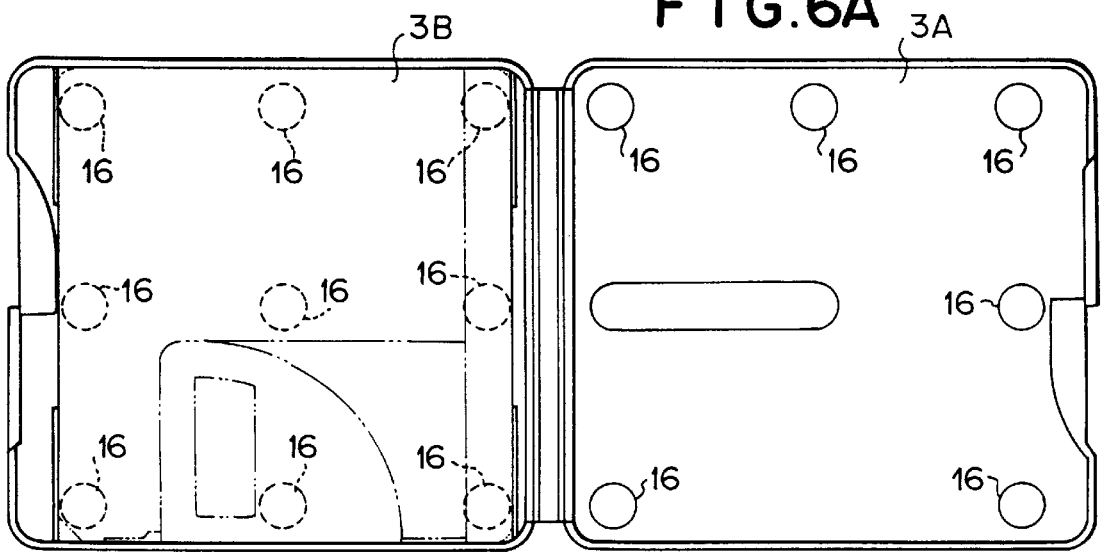
FIG. 6A is a plan view showing a disk cartridge case in accordance with a second embodiment of the present invention with the lid member opened and a disk cartridge contained in the case body.
Figure 6B:
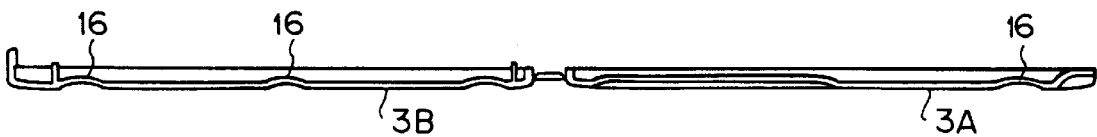
FIG. 6B is a cross-sectional view of the disk cartridge case of the second embodiment with the lid member opened.

For example, in the second embodiment shown in FIGS. 6A to 6C, a plurality of circular protrusions 16 are formed on both the lid member 3A and the case body 3B.

Figure 7C:
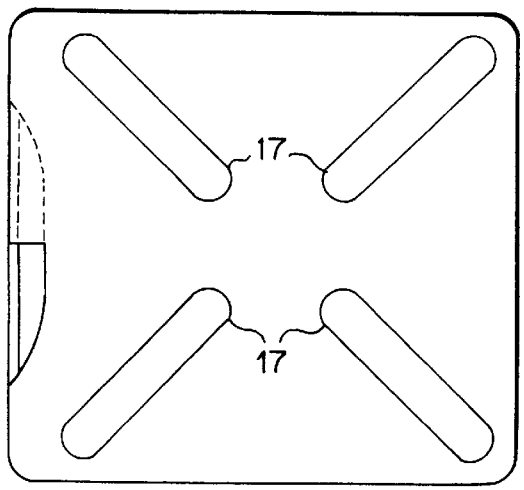
FIG. 7C is a plan view showing the disk cartridge case of the third embodiment with the lid member closed.
Figure 7A:
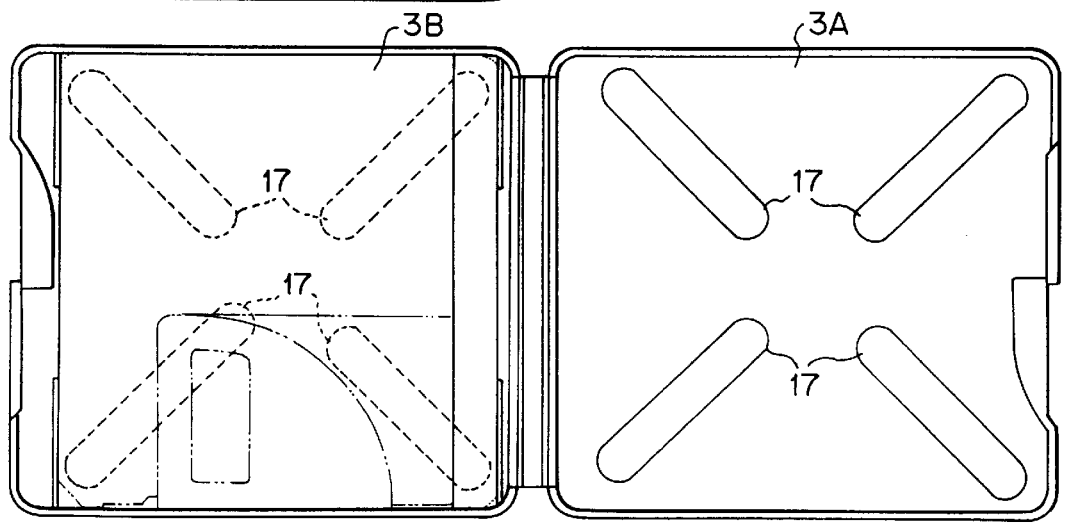
FIG. 7A is a plan view showing a disk cartridge case in accordance with a third embodiment of the present invention with the lid member opened and a disk cartridge contained in the case body.
Figure 7B:
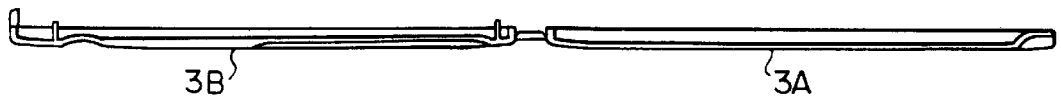
FIG. 7B is a cross-sectional view of the disk cartridge case of the third embodiment with the lid member opened.

In the third embodiment shown in FIGS. 7A to 7C, a plurality of elongated protrusions 17 are formed on both the lid member 3A and the case body 3B to extend diagonally.

Figure 8C:
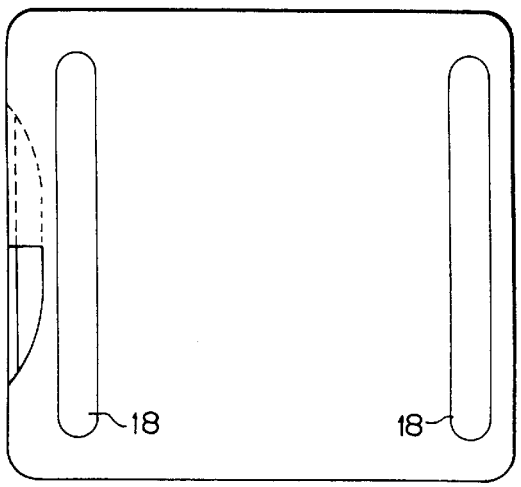
FIG. 8C is a plan view showing the disk cartridge case of the fourth embodiment with the lid member closed.
Figure 8A:
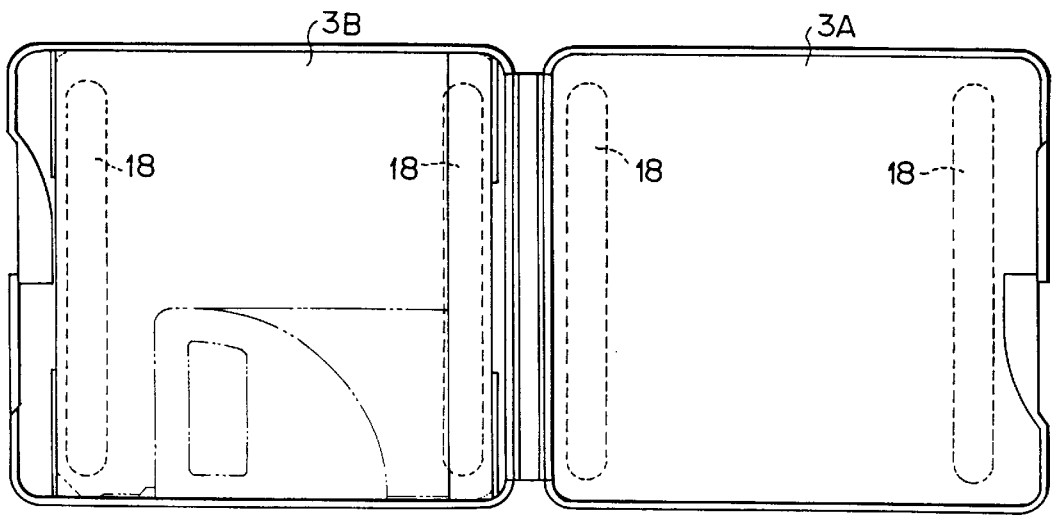
FIG. 8A is a plan view showing a disk cartridge case in accordance with a fourth embodiment of the present invention with the lid member opened and a disk cartridge contained in the case body.
Figure 8B:
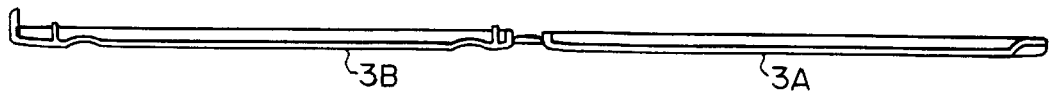
FIG. 8B is a cross-sectional view of the disk cartridge case of the fourth embodiment with the lid member opened.

In the fourth embodiment shown in FIGS. 8A to 8C, a pair of elongated protrusions 18 are formed on each of the lid member 3A and the case body 3B spaced from each other.

Thus the protrusion may be single or plural in number. Further the protrusions may be formed on both the lid member 3A and the case body 3B or on either of them. However when the protrusions are formed on both the lid member 3A and the case body 3B, it is preferred that the protrusions be in alignment with each other in the direction of thickness of the disk cartridge case 3. Otherwise there arises a fear that the disk cartridge is deformed under the pressures which act on the disk cartridge in opposite directions at different parts of the disk cartridge when the disk cartridge case is closed.

The lid member 3A and the case body 3B may be hinged by other structure such as a hinge comprising a pin and holes. Further the latch portions may be of other various structures.

What is claimed is:

1. A disk cartridge case which contains therein a flat disk cartridge having a body defining opposite major side surfaces and containing a rotatable disk, said disk cartridge case comprising a case body and a lid member each having an inner surface and which are hinged together at first side edges to be opened and closed, wherein the improvement comprises:

a plurality of case protrusions disposed at spaced apart, non-aligned locations on the inner surface of said case body, a plurality of lid protrusions disposed on the inner surface of said lid member in positions such that said case protrusions and said lid protrusions are opposed to each other and abut against said opposite major side surfaces of said body of said flat disk cartridge without abutting against an exposed disk portion of the rotatable disk when said disk cartridge is closed, thereby to restrain said flat disk cartridge contained in said disk cartridge case from moving in a direction of thickness of said disk cartridge case only with said case protrusions and said lid protrusions.

2. The disk cartridge case as defined in claim 1, wherein said case body and said lid member are connected by a connecting plate which is connected to said first side edges by way of self-hinges disposed at opposite side edges of said connecting plate, and wherein the case body, the lid member, the connecting plate and the self-hinges are integrally formed of a plastic material.

3. The disk cartridge case as defined in claim 1, wherein said case protrusions comprise a plurality of circular protrusions, and wherein said lid protrusions comprise a plurality of circular protrusions.

4. The disk cartridge case as defined in claim 1, wherein said case protrusions comprise a plurality of elongated protrusions which extend diagonally, and wherein said lid protrusions comprise a plurality of elongated protrusions which extend diagonally.

5. The disk cartridge case as defined in claim 1, wherein said disk cartridge is formed of polypropylene.

6. A disk cartridge case which contains therein a flat disk cartridge having a body defining opposite major side surfaces and containing a rotatable disk, said disk cartridge case comprising a case body and a lid member each having an inner surface and which are hinged together at first side edges to be opened and closed, wherein the improvement comprises:

case protrusions disposed at at least three spaced apart, non-aligned locations on the inner surface of of said case body, lid protrusions disposed on the inner surface of said lid member in positions such that said case protrusions and said lid protrusions are opposed to each other and abut against said opposite major side surfaces of said body of said flat disk cartridge without abutting against an exposed disk portion of the rotatable disk when said disk cartridge case is closed, thereby to restrain said flat disk cartridge contained in said disk cartridge case from moving in a direction of thickness of said disk cartridge case only with said case protrusions and said lid protrusions.

7. The disk cartridge case as defined in claim 6, wherein said case body and said lid member are connected by a connecting plate which is connected to said first side edges by way of self-hinges disposed at opposite side edges of said connecting plate, and wherein the case body, the lid member, the connecting plate and the self-hinges are integrally formed of a plastic material.

8. The disk cartridge case as defined in claim 6, wherein said disk cartridge case is formed of polypropylene.

9. The disk cartridge case as defined in claim 6, wherein the protrusions comprise a plurality of circular protrusions.

10. The disk cartridge case as defined in claim 6, wherein the protrusions comprise a plurality of elongated. protrusions which extend diagonally.

11. The disk cartridge case as defined in claim 6, wherein the protrusions comprise a pair of elongated, spaced apart protrusions formed on each of said case body and said lid member.

* * * * *